United States Patent
Volker

(10) Patent No.: US 10,184,594 B1
(45) Date of Patent: Jan. 22, 2019

(54) COMPOSITE PIPE

(71) Applicant: Todd A. Volker, Overland Park, KS (US)

(72) Inventor: Todd A. Volker, Overland Park, KS (US)

( * ) Notice: Subject to any disclaimer, the term of this patent is extended or adjusted under 35 U.S.C. 154(b) by 0 days.

(21) Appl. No.: 14/993,187

(22) Filed: Jan. 12, 2016

Related U.S. Application Data

(63) Continuation-in-part of application No. 13/895,513, filed on May 16, 2013, now abandoned.

(60) Provisional application No. 61/654,327, filed on Jun. 1, 2012.

(51) Int. Cl.
  *F16L 9/12* (2006.01)
  *F16L 9/16* (2006.01)

(52) U.S. Cl.
  CPC ............. *F16L 9/123* (2013.01); *F16L 9/16* (2013.01)

(58) Field of Classification Search
  CPC .... B32B 2597/00; F16L 11/082; F16L 11/083
  USPC ......................................................... 138/144
  See application file for complete search history.

(56) References Cited

U.S. PATENT DOCUMENTS

| | | |
|---|---|---|
| 2,491,761 A | 12/1949 | Parker et al. |
| 2,700,631 A | 1/1955 | Ferguson |
| 2,742,931 A | 4/1956 | Ganahi |
| 2,783,173 A | 2/1957 | Walker |
| 2,815,043 A | 12/1957 | Kleiner |
| 2,888,042 A | 5/1959 | St. John |
| 3,026,223 A | 3/1962 | Gessler et al. |
| 3,481,369 A | 12/1969 | Ganahl |
| 3,948,292 A | 4/1976 | Goto |
| 4,104,095 A | 8/1978 | Shaw |
| 4,289,168 A | 9/1981 | Lecourt |
| 4,347,090 A | 8/1982 | Anderson |
| 4,515,737 A | 5/1985 | Karino |
| 4,663,107 A | 5/1987 | Takada et al. |
| 4,898,212 A | 2/1990 | Searfoss |
| 4,968,545 A | 11/1990 | Fellman |
| 5,422,063 A * | 6/1995 | Pelzer ................... B29C 47/882 264/209.1 |
| 5,629,062 A | 5/1997 | Ejiri |
| 5,780,123 A * | 7/1998 | Kamiyama ......... B29C 66/1142 138/150 |

(Continued)

FOREIGN PATENT DOCUMENTS

WO    WO 9220453 A1    11/1992

*Primary Examiner* — Craig Schneider
*Assistant Examiner* — David Deal
(74) *Attorney, Agent, or Firm* — Erickson Kernell IP, LLC

(57) ABSTRACT

A composite pipe and method of manufacture comprises an inner core coated with a resinous material, a prepreg material helically wound about the inner core and an outer shell covering the wound prepreg materials. The materials are applied at preselected melt temperatures to assure coherence among the materials and preclusion of voids and/or annuli therebetween. The melt temperature of the inner core is greater than the melt temperature of the coating and prepeg layers such that the heating needed to cohere these materials has no deleterious effect on the integrity of the inner pipe core. A cooling of the inner pipe core during initial application of the tape layer of prepreg materials stabilizes the radial configuration of the pipe core during tape wrapping and thus the appearance of undesirable voids and/or annuli in the composite pipe mass.

14 Claims, 3 Drawing Sheets

(56) References Cited

U.S. PATENT DOCUMENTS

| | | | |
|---|---|---|---|
| 5,870,123 | A | 2/1999 | Lorenze, Jr. et al. |
| 6,551,534 | B1 | 4/2003 | Kirjavainen et al. |
| 6,629,547 | B1 | 10/2003 | Yamaguchi |
| 6,688,339 | B2 | 2/2004 | Yamaguchi |
| 6,889,716 | B2 | 5/2005 | Lundberg |
| 2001/0018933 | A1 | 9/2001 | Martucci et al. |
| 2010/0243097 | A1 | 9/2010 | Jani |
| 2011/0226374 | A1 | 9/2011 | Kalman et al. |
| 2011/0290362 | A1 | 12/2011 | Weil et al. |
| 2012/0155813 | A1* | 6/2012 | Quigley ................. E21B 17/20 385/101 |
| 2013/0133775 | A1* | 5/2013 | Duncan ................. F16L 11/24 138/129 |
| 2013/0263963 | A1 | 10/2013 | Kalman et al. |
| 2013/0276932 | A1 | 10/2013 | Taylor |
| 2013/0312862 | A1 | 11/2013 | Kalman et al. |
| 2013/0319571 | A1* | 12/2013 | Volker ..................... F16L 9/16 138/144 |

\* cited by examiner

COMPOSITE PIPE

CROSS REFERENCE TO RELATED APPLICATION

This application is a continuation-in-part of co-pending application Ser. No. 13/895,513, filed May 16, 2013, which claims the benefit of provisional application Ser. No. 61/654,327, filed Jun. 1, 2012.

BACKGROUND

This invention relates to a composite pipe and the manufacture thereof.

Flexible and rigid pipes are commonly used to transport various types of fluids or gases. The pipes comprise a plurality of materials joined together in various manners to form a conduit for advance of the fluid and/or gas materials therethrough.

The use of the extrusion process to form a pipe having multiple material layers is known. Various disadvantages with the extrusion process have arisen including the possibility of variances in the pipe thickness over the length of the pipe and radial/hoop expansion of the pipe during the manufacturing process. Such actions may cause internal deformities leading to leakage and/or burst during fluid and/or gas transport. Also, longitudinal movement between the material layers will cause abrasion therebetween resulting in premature wear and possible pipe failure. Moreover, in past pipes annuli and/or voids may appear between the pipe layers. If not properly vented, undesirable permeation of the gases of the transported fluid and/or gas into these areas may occur, which may lead to pipe failure.

In response thereto a coherent, multi-layer pipe is desired which avoids the above problems. A method of pipe manufacture is presented, which provides a coherent bond among the material layers so as to present a unitary mass of material with no voids therein as well as longitudinal or radial movement therebetween. The process is enhanced by the relationships of the melt temperatures of the material layers as well as a cooling of the extruded pipe core during the subsequent wrapping of intermediate reinforcing layers of a resinous prepreg or similar material. The melt temperature relationships and/or cooling precludes expansion and contraction of the pipe core. Thus the pipe core remains round without the appearance of undesirable annuli or voids between the material layers. Accordingly, the bonding presents a cohered multi-layer pipe, which has various desirable properties including chemical and pressure resistance, the preclusion of annuli and/or voids between material layers and resistance to lateral and radial layer movement.

It is therefore a general object of the invention to provide a versatile composite pipe and method of mass production manufacture for effectively transporting pressurized fluids or gases therethrough.

Another object of this invention is to provide a composite pipe and method of manufacture, as aforesaid, having a plurality of layered materials cohered into a unitary mass.

A further object of this invention is to provide a composite pipe and method of manufacture, as aforesaid, which precludes the appearances of voids and annuli between the material layers.

Still another object of this invention is to provide a composite pipe having a method of manufacture, as aforesaid, which precludes undesirable radial movement of the inner core during pipe manufacture and application of the material layers.

Another particular object of this invention is to provide a composite pipe, as aforesaid, having no free floating fibers within the pipe mass.

Still a further object of this invention is to provide a composite pipe, as aforesaid, which can be effectively butt fused in the field.

A particular object of this invention is to provide a composite pipe, as aforesaid, wherein the relationships of the melt temperatures among the pipe layers are chosen so as to be efficiently controlled to preclude deformities during pipe manufacture.

Other objects and advantages of this invention will become apparent from the following description taken in connection with the accompanying drawings, wherein is set forth by way of illustration and example, a now preferred embodiment of this invention.

DESCRIPTION

Figure 1:
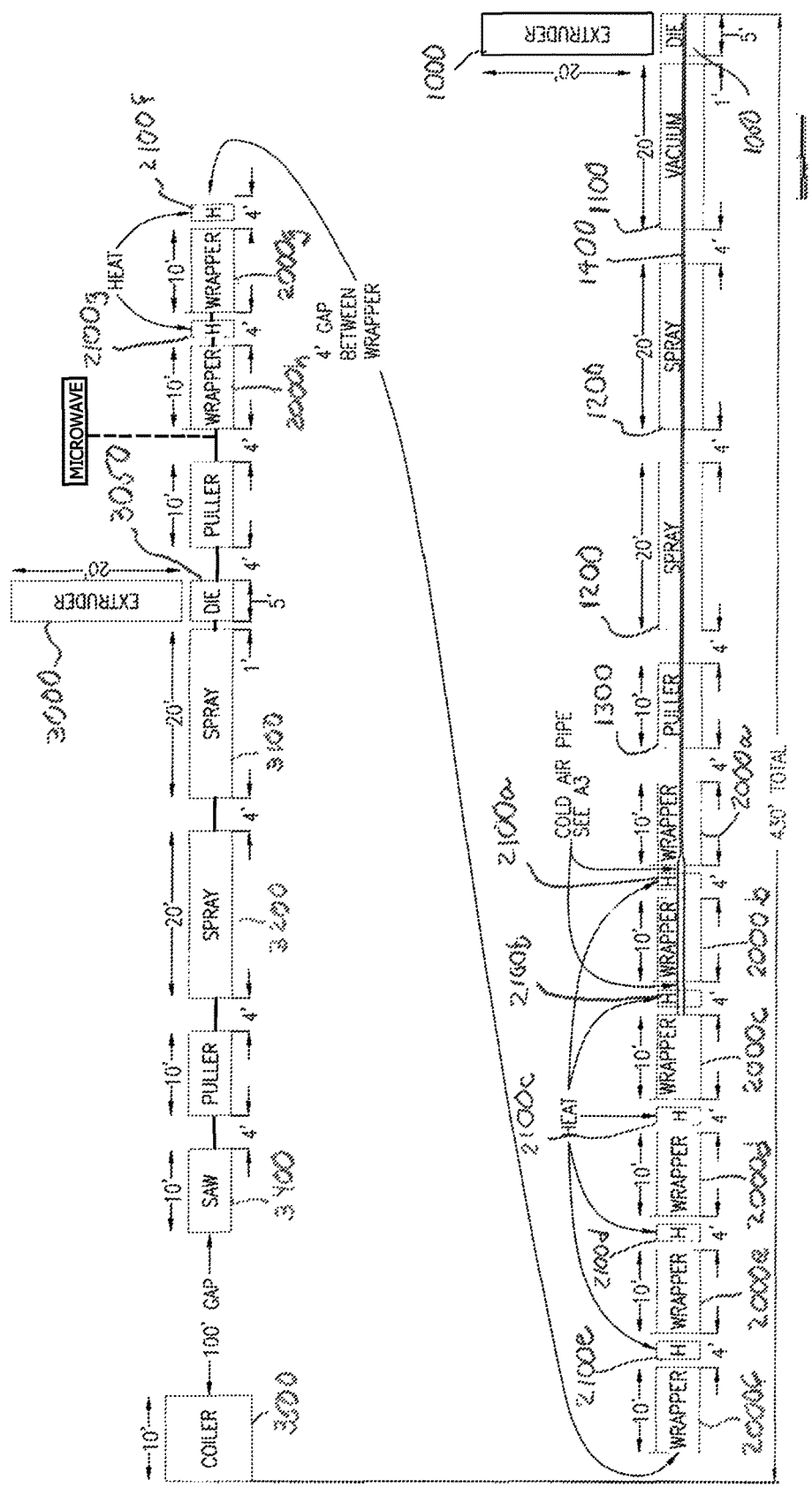
FIG. 1 is a block diagram showing the manufacturing process.

Turning more particularly to the drawings, FIG. 1 illustrates the basic manufacture of the composite pipe so as to present a composite pipe having the above-described advantages.

Figure 5:
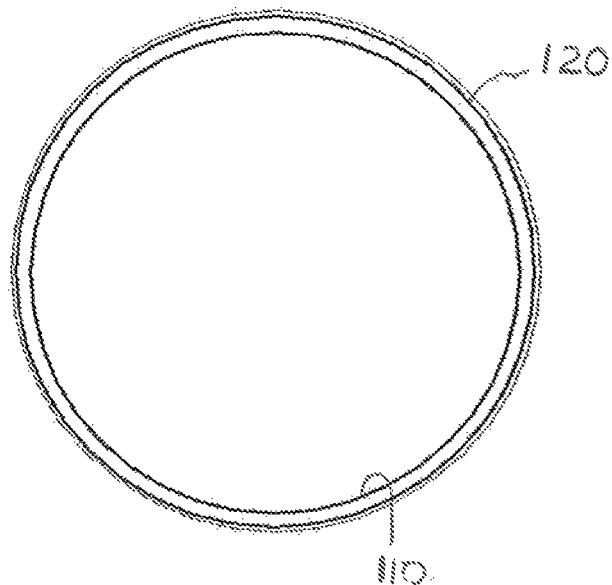
FIG. 5 is an end view of the inner pipe core.

As shown in FIG. 5, the pipe includes an inner core 110, which is formed by a conventional extrusion process initiated at extruder 1000. The utilized material of the interior layer 110 of core is preferably a high density thermoplastic PE 4710 industrial polythene material. The advantages of such a material are a good chemical resistance, high impact resistance, good abrasion resistance, low weight and ease of coupling. At this time, longitudinal tape having fiberglass strands or other reinforcing fiber materials may be introduced into the thickness of core 110, via extruder 1000, to provide longitudinal support therealong. I use the term "fiberglass" in its general sense as referred to plastic and glass in a fibrous or filament form. The outer coating 120 of the core 110 presents a relatively thin polyethylene material having a lesser density than the material of layer 110 with a melt temperature of approximately 230° F. The melt temperature is lower than the melt temperature (285°-300°) of the material of the core 110 such that a heating of the coating 120 to its melt temperature will have no undesirable effect on the integrity of the core 110. The melt temperature of the coating 120 approximates the melt temperature of the resin in the prepreg tape material to be subsequently wrapped about the inner core 110 at stations 2000a-20000h.

Subsequent to the extrusion process at 1000 the coated pipe core 110 passes through a conventional vacuum/cooling tank 1100, which sizes the pipe to its desired outside diameter. Sprayers 1200 cool the core 110 towards an ambient temperature. Puller 1300 directs the relatively rigid pipe core 110 downstream so that proper line speed and pipe stabilization can be achieved.

Subsequently, tape layers 200a, 200b of a prepreg or similar material having fiberglass-like strands therein are to be helically wound in opposed directions about the coated inner core. One form of the tape is as discussed in the Dyksterhouse U.S. Pat. No. 6,524,690. My tape currently comprises a 35% polyethylene, 5% moleic anhydride and 60% fiberglass mixture. It is understood that other materials may be used in lieu of fiberglass, particularly those to provide a strengthening effect and/or enhance conductivity during various forms of heating. Carbon black or other material suitable for induction heating may also be utilized to enhance the heating process, particularly if microwaves are to be used. FIG. 1 shows in a phantom line extension a microwave heater 2200 after the last wrapper station 2000h. In this alternative method the microwave 2200 may be used in lieu of the heaters 2100a-2100d. I have found that the presence of the carbon in the material layers 120, 200a, 200b enables these layers, once microwave excitable, to act as a heat source which enhances the heating and bonding processes. The melt temperature of the polyethylene resin in the tape approximates 230° F. similar to the melt temperature of the outer coating 120 of the pipe core 110.

Figure 2:
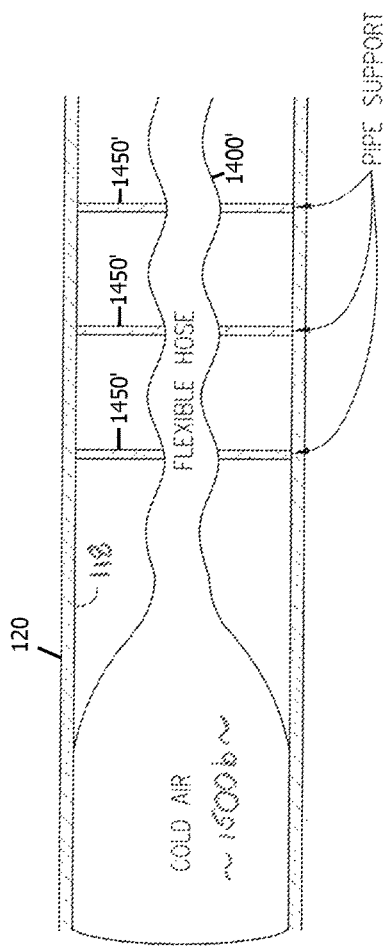
FIG. 2 illustrates one form of the cooling apparatus for the pipe core.
Figure 3:
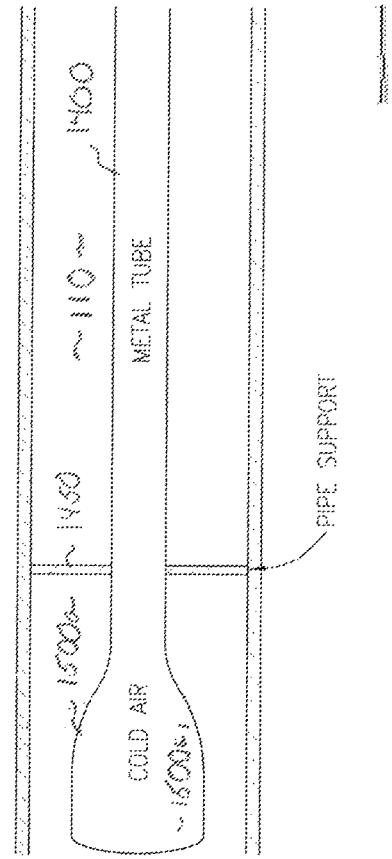
FIG. 3 illustrates another form of the cooling apparatus for the inner pipe core.

During the wrapping process cooler air is to be introduced into the interior of the pipe core 110 by apparatus as shown in FIG. 2 or 3. The cooler air stabilizes the pipe core 110 so minimal expansion and subsequent contraction, if any, will occur during the subsequent wrapping and heating processes. Also, the melt temperature of the tape is below that of the inner core 110 such that no deformation of the pipe core 110 occurs during the wrapping process. The melt temperature of the inner core 110 may be chosen such that no undesirable deformities of the inner pipe core arise during the wrapping process even in the absence of internal cooling of the pipe core 110.

Heretofore, the disadvantages of such radial movements of the pipe core 110 have not been considered. Undesirable voids may appear between the pipe core 110 and subsequent tape layers during the wrapping process as radial movement of the heated core 110 may cause displacement from the applied wraps. Thus, it is desirable to maintain a temperature within the pipe core below the melt temperatures of the coating 120 and tape layers so as to preclude such radial movement. The cooling air temperature must not only cool the pipe core 110 but avoid crystallization of the pipe core 110 mass.

To achieve such cooling, an elongated metal conduit 1400 or flexible conduit 1400' is inserted through a central aperture in the initial extrusion die 1050 so that it is centrally located within the inner core 110. The conduit 1400, 1400' directs cold air through the path taken by the inner core 110 through stations 1100, 1200, 1300 and at least two subsequent wrapping and heating stations. The conduit 1400 is supported within the core 110 and away from its inner wall 118 by a plurality of supports 1450, 1450' attached about the conduit 1400. The conduit supports 1450 are made of a slick material, e.g., acetal, to provide a maximum slippage between the stationary supports 1450, 1450' and interior surface 118 during movement of the pipe core 110. As such the inner core 110 is not inhibited in its downstream travel.

Cold air is introduced into the inner core 110 via nozzle 1500a or 1500b fixed at the end of pipe conduit 1400. The nozzle terminus is preferably after the core 110 is helically wrapped with the first tape layer at station 2000a. Nozzle 1500 may be of various shapes and materials as shown in FIGS. 2 and 3. Cold air is introduced into the conduit 1400 at the opposed end by any suitable fan/refrigeration unit combination positioned upstream of die 1050.

Figure 6:
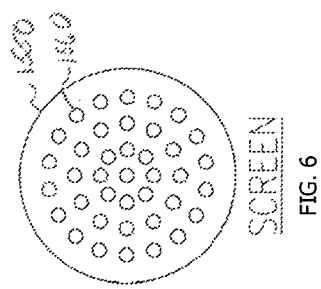
FIG. 6 illustrates the screen at the end of the cool air conduit.
Figure 4:
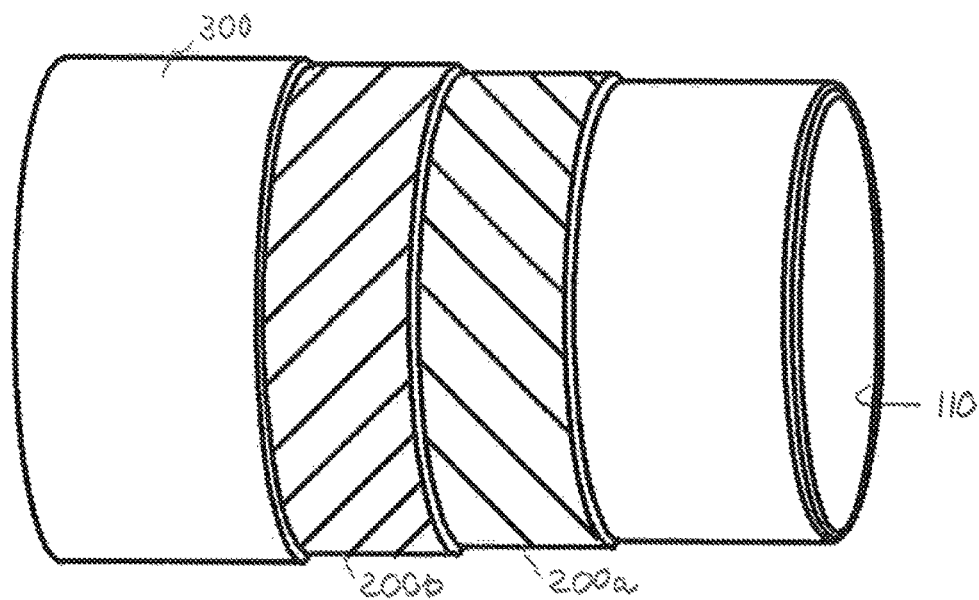
FIG. 4 illustrates the various layers of the composite pipe.

A screen 1550 (FIG. 6) is positioned at the open end of nozzle 1500. Screen 1550 has a plurality of apertures 1560 therein so as to regulate the discharge of air from conduit pipe 1400. The number of apertures is selected so that the desired cooling temperature will be achieved as the core is wrapped and heated at stations 2000a, 2100a, 2000b and 2100b. The air discharge precludes a pressure buildup therein which may undesirably expand the inner core 110.

After each wrapping station 2000a-2000g, a heater 2100a-2100g raises the resin temperatures of the coating 120 and resin in the first and second helically-wrapped tape layers to their melt temperatures to insure a coherent bond therebetween. Such heat may be supplied by conventional film heat apparatus, e.g., microwave, infrared, laser induction heating, etc. The microwave process may be enhanced by impregnating carbon black fibers within the tape being wound about the exterior surface of the core.

During wrapping of the first two layers at stations 2000a, 2000b, the above-described cooling pipe apparatus 3000, as shown in FIGS. 2-3, introduces cool air into the inner pipe core so that the heat applied by heaters 2100a, 2100b does not expand the pipe core 110. At station 2000b, the tape is helically wound in an opposed direction about the first helical layer of the tape thus covering the exterior coating 120 of the pipe core 110. As such, temperature migration resulting from the heating of the helically-wrapped tape layers about the pipe core 110 is diminished, if not precluded. Thus, internal cooling of the pipe core 110 may no longer be needed beyond heat station 2100b. Subsequent layers of the prepreg or similar materials are helically wound in opposed directions about core 110. Heaters 2100a et seq. insure that the melt temperatures of the resin in the preceding tape layer and preceding contiguous layers are achieved to attain a coherent bond therebetween. As such, no voids appear in the mass surrounding the inner core 110. The absence of such voids/annuli precludes the confinement of gases within the pipe layers which may permeate from the pipe core. It is understood that future tapes may be developed wherein only one wrapping to cover the exterior coating 120 is needed.

In lieu of multiple heaters 2100a-2100e, a microwave unit 2200 may be placed after the last wrapping station 2000h as shown in phantom lines in FIG. 1 for passage of the wrapped pipe therethrough. I have found that the use of carbon fibers or other microwave excitable materials in the coating 120 and wrapped pipe layers enables the layers to act as their own heat sources once heated by the microwave 2200. (Induction or other heating with suitable materials that may be exited thereby may also be used.) Thus, the layers are raised to their melt temperatures to achieve the coherent bond therebetween. Also, the microwave 2200 may be used in lieu of the plurality of heaters 2100a-2100g.

After the last wrapping station 2000h, the pipe with tape layers therearound passes through a cross head overlay dye at 3050. An outer shell 300 of a polyethylene 100 or similar material is extruded at 3000 to encompass the pipe and tape layers. The extended temperature of the resin in this outer shell is approximately 400° F. Thus, the resin in the preceding tape layers which precede this outer shell will also reach their melt temperature such that a coherent bond is achieved between the exterior shell and preceding tape layers.

A composite pipe having a plurality of cohered layers with no voids and/or annuli therebetween are presented for cooling at stations 3100, 3200, cutting 3400 and coiling 3500.

It is understood that the above process enables flexible coil pipe to be manufactured up to diameters of eight inches with rigid pipe of larger diameters. In either case it is necessary to join the pipe sections in the field at a minimal cost. The above-described pipe construction enables a cost-effective butt fusion therebetween. The end joints of the pipe sections are wound with the same or similar tape of prepreg materials as utilized in the wrapping process. Other types of wraps hereafter developed may be used. The tape and pipe ends are heated on site to their melt temperatures so as to provide cohesion therebetween. As such there is no need for expensive mechanical couplings or welding of the pipes in the field. Moreover, during this process the exterior surfaces of the pipe remain intact, which enhances the juncture between pipe sections.

It is understood that the interior surface of pipe core 110 may be fluorinated prior to the core 110 reaching the first wrapping station 2000*a*. Alternatively, an EVOH barrier material may also be applied. Subsequent wrapping of the core 110 may still be required with the wraps being secured either by heating as above described or adhesives in lieu of heating.

It is to be understood that while certain forms of this invention have been illustrated and described, it is not limited thereto, except in so far as such limitations are included in the following claims.

Having thus described the invention, what is claimed as new and desired to be secured by Letters Patent is:

1. A composite pipe comprising:
an inner pipe core of a resinous material having a melt temperature;
an exterior resinous coating of said inner pipe core having a melt temperature lower than the melt temperature of said resinous material of said inner pipe core, the melt temperatures having a difference such that a heating of the coating to its melt temperature has no effect on the integrity of the resinous material of the inner pipe core;
at least two layers of tape comprising a resinous material having reinforcing fibers impregnated therein, a melt temperature of the tape resinous material at least the melt temperature of the exterior resinous coating of the inner pipe core;
said at least two tape layers being helically wound in opposed directions about said pipe core after said pipe core is coated with said exterior resinous coating such that said tape layers cover said exterior resinous coating, whereupon once said melt temperatures of said exterior resinous coating and said at least two tape layers are attained, said at least two tape layers and said exterior resinous coating cohere with no voids therebetween;
an outer shell of resinous material having a melt temperature at least said melt temperature of said at least two tape layers, said outer shell applied about said at least two tape layers at a temperature sufficient to attain the melt temperature of said outer shell and layers of said at least two tape layers preceeding said outer shell, whereupon to cohere said outer shell, said at least two tape layers and said inner pipe core, whereby to preclude voids and relative movement therebetween.

2. The apparatus as claimed in claim 1 wherein said melt temperature of said resinous material of said inner pipe core is at a higher temperature relative to said melt temperatures of said coating and said at least two tape layers.

3. The apparatus as claimed in claim 1 wherein said composite pipe presents a free end adapted to be positioned contiguous a free end of a second composite pipe as in claim 1, said apparatus further comprising:
a wrap of tape having a resinous material with reinforcing fibers impregnated therein, a melt temperature of said resinous material of said wrap of tape at least the melt temperature of said resinous material of said at least two tape layers, said wrap of tape capable of being wound about said free end of said composite pipe and a contiguous free end of the second composite pipe, whereupon said melt temperatures of said wrap of tape and said at least two tape layers are attained for coherence therebetween, whereby to join said composite pipe to the second composite pipe.

4. The apparatus as claimed in claim 1 further comprising additional layers of said tape helically wound about said at least two layers of tape, each additional tape layer wound in a helical direction opposite an immediately preceding wound tape layer whereupon said melt temperatures of said resinous material in said additional wound tape layer and preceding contiguous tape layers are attained to cohere each additional tape layer with preceding contiguous tape layers with no voids and relative movement therebetween.

5. The apparatus as claimed in claim 1 wherein said at least two tape layers include materials therein conducive to excitation by a heating whereby to attain said melt temperatures and cohere said at least two layers of tape and said coating upon a heating thereof.

6. The apparatus as claimed in claim 1 further comprising:
means for maintaining said inner pipe core at a preselected temperature during said winding of at least the first and second layers of said at least two tape layers, said preselected temperature being less than said melt temperature of said exterior resinous coating of said inner pipe core.

7. A composite pipe comprising:
an inner pipe core of a resinous material having a melt temperature;
an exterior resinous coating about said inner pipe core having a melt temperature lower than said melt temperature of said resinous material of said inner pipe core, a heating of said resinous coating to said resinous coating melt temperature having no effect on the integrity of said resinous material of said inner pipe core;
at least first and second layers of tape comprising a resinous material having reinforcing fibers impregnated therein, a melt temperature of the tape resinous material at least the melt temperature of the exterior resinous coating of the inner pipe core;
said first layer being helically wound about said pipe core after said pipe core is coated with said exterior resinous coating, said first tape layer being cohered with said exterior resinous coating with no voids therebetween upon said melt temperatures of said exterior resinous coating and said first tape layer being attained;
said second tape layer being helically wound in an opposed direction about said first tape layer and pipe core, whereupon said second tape layer being cohered with said first tape layer and said inner pipe core with no voids therebetween upon said melt temperatures of said layers and pipe core being attained;
an outer shell of resinous material having a melt temperature at least said melt temperature of said first and second tape layers, said outer shell applied about said at least first and second layers at a temperature sufficient to attain the melt temperatures of said outer shell and layers of tape underneath said outer shell, wherein to cohere said outer shell, said tape layers and said coating of said inner pipe core with the preclusion of voids and relative movement therebetween.

8. The apparatus as claimed in claim 7 wherein subsequent tape layers comprise additional layers of said tape helically wound about said at least first and second layers of tape, each additional tape layer wound in a helical direction opposite an immediately preceding wound tape layer, said each additional tape layer being in coherence with previous tape layers upon said melt temperatures of said resinous material in contiguous tape layers being attained, whereupon to cohere each additional tape layer with preceding contiguous tape layers with no voids therebetween.

9. The apparatus as claimed in claim 7 further comprising:
means for maintaining said inner pipe core at a preselected temperature during said winding of said first and second tape layers, said preselected temperature being less than said melt temperature of said exterior resinous coating of said inner pipe core.

10. The apparatus as claimed in claim 7 wherein said first layer of tape includes materials therein conducive to excitation by heating whereby to maintain said coherence of said first layer of tape and said coating upon a microwave heating thereof.

11. A composite pipe comprising:
an inner pipe core of a resinous material having a melt temperature
an exterior resinous coating about said inner pipe core having a melt temperature lower than said melt temperature of said resinous material of said inner pipe core, a heating of said resinous coating to said resinous coating melt temperature having no effect on the integrity of said resinous material of said inner pipe core;
at least one layer of tape comprising a resinous material having reinforcing fibers impregnated therein, a melt temperature of the tape resinous material at least the melt temperature of the exterior resinous coating of the inner pipe core;
said at least one layer of tape being wound to cover said coating with no voids therebetween upon said melt temperatures of said pipe coating and said first tape layer being attained;
an outer shell of resinous material having a melt temperature at least said melt temperature of at least one tape layer, said outer shell applied about said at least one tape layer at a temperature sufficient to attain the melt temperatures of said shell and at least one layer of tape contiguous with said outer shell to cohere said outer shell, said at least one tape layer and said coating of said inner pipe core.

12. The apparatus as claimed in claim 11 wherein said at least one layer of tape includes materials therein conducive to excitation by heating, whereby said at least one layer of tape and said coating cohere upon a heating thereof.

13. The apparatus as claimed in claim 12 wherein said heating comprises a microwave heating.

14. The apparatus as claimed in claim 12 wherein said heating comprises an induction heating.

\* \* \* \* \*